Patented Oct. 6, 1936

2,056,163

UNITED STATES PATENT OFFICE 2,056,163

DENATURED ALCOHOL

Julius F. T. Berliner, Wilmington, Del., assignor to E. I. du Pont de Nemours & Company, Wilmington, Del., a corporation of Delaware No Drawing. Application July 16, 1932, Serial No. 623,013. Renewed October 22, 1935

21 Claims. (Cl. 202—77)

This invention relates to denatured alcohol and more particularly to new and improved denatured alcohol compositions of an unpotable but at the same time scientifically and commercially utilizable character.

It is an object of the present invention to provide a new and improved denatured alcohol composition.

Other objects and advantages of the invention will be apparent by reference to the following specification wherein the details and preferred embodiments are described.

According to the present invention a denatured ethyl alcohol is prepared containing the mixture of liquid oxygen-containing organic compounds, or fractions thereof, boiling above methanol, obtainable in the known synthesis of methanol and higher alcohols by catalytic hydrogenation of oxide of carbon under pressure. This synthesis is effected, for example, by passing a mixture of hydrogen and carbon monoxide, say in the volume ratio of two to one, at above 200 atmospheres and at a temperature within the range of 400–600° C. over a zinc-chromium catalyst, to which, preferably, a small amount of alkali is added. The catalyst may be prepared by the general method described in Lazier U. S. Patent 1,746,782. Other catalysts, as well as methods for their preparation and use in the synthesis of methanol and higher alcohols, are described in the following patents: Lazier 1,746,781; 1,746,783; 1,829,046; Larson 1,844,587; Storch 1,681,750; 1,681,752; 1,738,971; Williams Reissue 18,302. The condensate obtained by cooling the gaseous products comprises, after separation of the water formed, methanol together with alcohols of higher molecular weight and some unidentified oxygen-containing organic compounds. Thus, for example, among the higher alcohols there have been identified normal propanol, isobutanol, 2-methyl butanol-1, 3-methyl butanol-2, 2,4-dimethyl pentanol-3,3-methyl pentanol-2, 2-methyl pentanol-1, 2,4-dimethyl pentanol-1, and 4-methyl hexanol-1.

By fractional distillation the methanol is separable from the materials boiling above it which comprise the denaturant of the present invention.

Although the complete mixture of products boiling above methanol is suitable and desirable for use as a denaturant, individual fractions thereof are also satisfactory, such, for example, as that fraction boiling in a range between about 104° and 195° C., or again that fraction boiling in the more limited range between about 133° C.–154° C. Furthermore, certain of the identified higher alcohols recovered from the above described mixture may be used as such for denaturing purposes, particularly 2,4-dimethyl pentanol-3 (di-isopropyl carbinol) (B. P. 139° C.), 2-methyl pentanol-1 (B. P. 147° C.), and 2,4-dimethyl pentanol-1 (B. P. 139° C.).

I prefer, however, to utilize either the complete mixture of constituents boiling in a range between about 104° C. and 195° C. or a more limited fraction thereof, for although the fraction boiling above 195° C. is a denaturing agent, it is of too high a boiling point to be satisfactory for certain special uses of denatured alcohol. Similarly I prefer to use the fraction of said product boiling above about 104° C., for the propyl alcohol contained in the fraction boiling below 104° C. is of greater utility in other applications and that fraction when used alone is not so efficacious a denaturing agent as the higher boiling fractions.

Compared with the efficacy of denaturants heretofore proposed, the denatured alcohol compositions according to my invention possess highly improved characteristics especially from the standpoint of difficulty of denaturant removal.

For example, after subjection to a test for denaturant removal corresponding to the most drastic treatment commercially feasible the denatured alcohol of my invention is still unpotable. This drastic test comprises dilution of the denatured alcohol with salt solution, decantation, treatment with carbon tetrachloride, activated charcoal and then an oxidizing agent, and finally distillation through a highly efficient column.

Except for the purposes of a beverage, however, the denatured alcohol of my invention can be used for most purposes for which undenatured alcohol is suitable, the product possessing substantially the same solvent and solubility properties and fuel values.

As added advantages of my invention, my denaturant (1) is non-poisonous to human beings in the resonably small amounts normally used in denatured alcohol compositions and without appreciable physiological action in such small quantities, (2) is distasteful and nauseating in very small proportions in the complete denatured alcohol composition, (3) causes a masking or loss of ethyl alcohol taste, (4) is miscible in all proportions with alcohol, (5) leaves no objectionable residue upon evaporation, (6) is readily available and relatively inexpensive, and (7) small amounts thereof are sufficient to produce the above described effects.

The proportions of my denaturant used with alcohol may vary over a wide range, as may the proportions of various fractions of differing boiling points and of various individual compounds. As with other denaturants, within certain limits, the larger the proportion of denaturant the more distasteful the product and the more difficult the separation of denaturant therefrom. Generally speaking, however, only small amounts of my denaturant are required, ethyl alcohol containing as little as 1% or even less being quite unpotable.

For purposes of illustration only and not by way of limitation, the following examples are given:

*Example 1.*—From one to five gallons of the organic liquid product boiling above methanol, obtainable in the catalytic hydrogenation of oxide of carbon, as hereinbefore described, is mixed with one hundred gallons of ethyl alcohol.

*Example 2.*—The denaturant of the preceding example may be replaced by the same proportions of similar material boiling within the range of about 104° to 195° C.

*Example 3.*—About 97 parts by volume of ethyl alcohol is mixed with about 3 parts of the fraction of the above described material boiling between about 133° C. and 154° C.

*Example 4.*—Three parts 2,4-dimethyl pentanol-3 is mixed with 97 parts ethyl alcohol.

*Example 5.*—Five parts 2-methyl pentanol-1 is mixed with 95 parts ethyl alcohol.

*Example 6.*—Four parts 2,4-dimethyl pentanol-1 is mixed with 96 parts ethyl alcohol.

Various changes may be made in the proportions of materials and in the specific fractions of denaturant utilized without departing from the invention or sacrificing any of the advantages thereof. Also, if desired, the denaturants hereinbefore described may be used along with other denaturants e. g. organic nitrogen bases, methanol, acetone, kerosene, petroleum oxidation products, terpenic bodies, halogenated organic derivatives, e. g. chlorinated phenols, etc.

Although the denaturant of this invention may be used with other denaturing materials as previously indicated, it will be understood that such other substances are not necessary for the purpose of obtaining a completely denatured ethyl alcohol. Likewise it will be understood that the denaturant of this invention may be used and is highly efficacious in denaturing action in whatever use and in whatever combination it may be desired to employ the denatured alcohol, including mixtures thereof with other liquids, such as solvent or fuel compositions containing petroleum or aromatic hydrocarbons, etc.

I claim:

1. Denatured alcohol comprising ethyl alcohol and a mixture of liquid oxygen-containing organic compounds, boiling above methanol and consisting principally of higher monohydroxy aliphatic alcohols, obtainable in the synthesis of methanol and higher alcohols by catalytic hydrogenation of oxide of carbon under pressure.

2. Denatured alcohol comprising ethyl alcohol and a mixture of liquid oxygen-containing organic compounds obtainable in the synthesis of methanol and higher alcohols by catalytic hydrogenation of oxide of carbon under pressure consisting principally of higher monohydroxy aliphatic alcohols, and boiling in the range of from about 104° C. to 195° C.

3. Denatured alcohol comprising ethyl alcohol and a mixture of liquid oxygen-containing organic compounds obtainable in the synthesis of methanol and higher alcohols by catalytic hydrogenation of oxide of carbon under pressure consisting principally of higher monohydroxy aliphatic alcohols, and boiling in the range of from about 133° C. to 154° C.

4. Denatured alcohol containing as a denaturant 1–5 gallons of the liquid oxygen-containing product consisting principally of higher monohydroxy aliphatic alcohols obtainable in the synthesis of methanol and higher alcohols by catalytic hydrogenation of oxide of carbon under pressure, per 100 gallons of ethyl alcohol.

5. Denatured alcohol containing as a denaturant 1–5 gallons of the liquid oxygen-containing product consisting principally of higher monohydroxy aliphatic alcohols obtainable in the synthesis of methanol and higher alcohols by catalytic hydrogenation of oxide of carbon under pressure and boiling in the range of from about 104° C. to 195° C., per 100 gallons of ethyl alcohol.

6. Denatured alcohol containing as a denaturant 1–5 gallons of the liquid oxygen-containing product consisting principally of higher monohydroxy aliphatic alcohols obtainable in the synthesis of methanol and higher alcohols by catalytic hydrogenation of oxide of carbon to methanol under pressure, and boiling in the range of from about 133° C. to 154° C., per 100 gallons of ethyl alcohol.

7. Denatured ethyl alcohol comprising ethyl alcohol and 2,4-dimethyl pentanol-3 as a denaturant.

8. Denatured ethyl alcohol comprising ethyl alcohol and 2-methyl pentanol-1 as a denaturant.

9. Denatured ethyl alcohol comprising ethyl alcohol and 2,4-dimethyl pentanol-1 as a denaturant.

10. The method of denaturing ethyl alcohol which comprises adding thereto a mixture of liquid oxygen-containing organic compounds consisting principally of higher monohydroxy aliphatic alcohols, boiling above methanol, obtainable in the synthesis of methanol and higher alcohols by catalytic hydrogenation of oxide of carbon under pressure.

11. The method of denaturing ethyl alcohol which comprises adding thereto a mixture of liquid oxygen-containing organic compounds consisting principally of higher monohydroxy aliphatic alcohols, boiling above methanol, obtainable in the synthesis of methanol and higher alcohols by catalytic hydrogenation of oxide of carbon under pressure, and boiling in the range of from about 104° C. to 195° C.

12. The method of denaturing ethyl alcohol which comprises adding thereto a mixture of liquid oxygen-containing organic compounds consisting principally of higher monohydroxy aliphatic alcohols, boiling above methanol, obtainable in the synthesis of methanol and higher alcohols by catalytic hydrogenation of oxide of carbon under pressure, and boiling in the range of from about 133° C. to 154° C.

13. The method of denaturing ethyl alcohol which comprises adding thereto 1–5 gallons of the liquid oxygen-containing organic compounds consisting principally of higher monohydroxy aliphatic alcohols, boiling above methanol, obtainable in the synthesis of methanol and higher alcohols by catalytic hydrogenation of oxide of carbon under pressure, per 100 gallons of ethyl alcohol.

14. The method of denaturing ethyl alcohol which comprises adding thereto 1–5 gallons of the liquid oxygen-containing organic compounds consisting principally of higher monohydroxy aliphatic alcohols, boiling above methanol, obtainable in the synthesis of methanol and higher alcohols by catalytic hydrogenation of oxide of carbon under pressure, and boiling in the range of from about 104° C. to 195° C., per 100 gallons of ethyl alcohol.

15. The method of denaturing ethyl alcohol which comprises adding thereto 1-5 gallons of the liquid oxygen-containing organic compounds consisting principally of higher monohydroxy aliphatic alcohols, boiling above methanol, obtainable in the synthesis of methanol and higher alcohols by catalytic hydrogenation of oxide of carbon under pressure, and boiling in the range of from about 133° C. to 154° C., per 100 gallons of ethyl alcohol.

16. Denatured ethyl alcohol comprising ethyl alcohol and a mixture of liquid oxygen containing organic compounds, boiling above methanol, obtainable in the synthesis of methanol and higher alcohols by catalytic hydrogenation of oxide of carbon under pressure, said mixture containing a preponderant amount of normal propanol, isobutanol, 2-methyl butanol-1, 3-methyl butanol-2, 2,4-dimethyl pentanol-3, 3-methyl pentanol-2, 2-methyl pentanol-1, 2,4-dimethyl pentanol-1, and 4-methyl hexanol-1.

17. Denatured ethyl alcohol comprising ethyl alcohol and a mixture containing a preponderant amount of normal propanol, isobutanol, 2-methyl butanol-1, 3-methyl butanol-2, 2,4-dimethyl pentanol-3, 3-methyl pentanol-2, 2-methyl pentanol-1, 2,4-dimethyl pentanol-1, and 4-methyl hexanol-1.

18. A method of denaturing ethyl alcohol which comprises adding thereto a mixture containing a preponderant amount of normal propanol, isobutanol, 2-methyl butanol-1, 3-methyl butanol-2, 2,4-dimethyl pentanol-3, 3-methyl pentanol-2, 2-methyl pentanol-1, 2,4-dimethyl pentanol-1, and 4-methyl hexanol-1.

19. A method of denaturing ethyl alcohol alcohol which comprises adding thereto 2,4-dimethyl pentanol-3 as a denaturant.

20. A method of denaturing ethyl alcohol which comprises adding thereto 2-methyl pentanol-1 as a denaturant.

21. A method of denaturing ethyl alcohol which comprises adding thereto 2,4-dimethyl pentanol-1 as a denaturant.

JULIUS F. T. BERLINER.